United States Patent [19]

Harris et al.

[11] Patent Number: 4,959,423

[45] Date of Patent: Sep. 25, 1990

[54] NUCLEATING AGENTS FOR POLY(ARYL ETHER KETONES)

[75] Inventors: James E. Harris, Piscataway; Paul A. Winslow, Millington, both of N.J.

[73] Assignee: Amoco Corporation, Chicago, Ill.

[21] Appl. No.: 191,325

[22] Filed: May 9, 1988

Related U.S. Application Data

[63] Continuation-in-part of Ser. No. 40,300, Apr. 20, 1987, abandoned.

[51] Int. Cl.$^5$ .................. C08L 61/00; C08L 71/00; C08L 79/08
[52] U.S. Cl. .................. 525/471; 525/534; 525/420; 525/436
[58] Field of Search .................. 525/471, 534

[56] References Cited

U.S. PATENT DOCUMENTS

| | | | |
|---|---|---|---|
| 4,609,714 | 9/1986 | Harris et al. | 525/471 |
| 4,657,990 | 4/1987 | Daoust et al. | 525/471 |

*Primary Examiner*—Ana L. Carrillo
*Attorney, Agent, or Firm*—Gary J. Cunningham; William H. Magidson; Ralph C. Medhurst

[57] ABSTRACT

Described herein are blends having increased crystallization rates comprising (a) at least 98 percent by weight of a poly(aryl ether ketone) having a melting point no more than about 390° C., and (b) 2 percent by weight or less of another poly(aryl ether ketone) having a melting point higher than about 400° C. The blends retain their attractive crystallization behavior even after prolonged treatment in the melt. The blends of this invention may be fabricated into any desired shape, for example, moldings, coatings, films, fibers, and particularly, for use as electrical insulation for electrical conductors.

8 Claims, No Drawings

NUCLEATING AGENTS FOR POLY(ARYL ETHER KETONES)

REFERENCE TO RELATED APPLICATION

This application is a continuation-in-part of U.S. patent application Ser. No. 040,300, filed Apr. 20, 1987 now abandoned.

FIELD OF THE INVENTION

This invention is directed to poly(aryl ether ketones) and poly(aryl ether ketone) blends possessing increased crystallization rates. The novel compositions contain (a) at least 98 percent by weight of a poly(aryl ether ketone) or a miscible blend thereof wherein the poly(aryl ether ketone) has a melting point no more than about 390° C., and (b) 2 percent by weight or less of another poly(aryl ether ketone) having a melting point higher than 400° C. The compositions of the instant invention retain their attractive crystallization behavior even after prolonged treatment in the melt. Moreover, these compositions display excellent mechanical properties as well as excellent chemical and heat resistance.

BACKGROUND OF THE INVENTION

Poly(aryl ether ketones) are known materials which display exceptional high temperature performance. They are crystalline polymers with melting points above 300° C. Two of these crystalline poly(aryl ether ketones) are commercially available and are of the following structure:

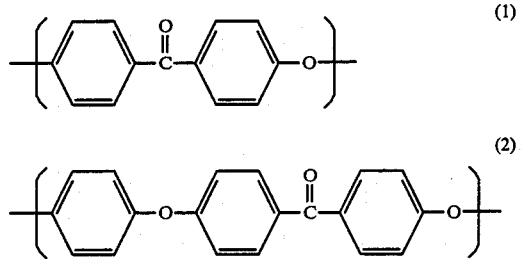

Over the years, there has been developed a substantial body of patent and other literature directed to formation and properties of poly(aryl ethers) (hereinafter called "PAE"). Some of the earliest work, such as by Bonner, U.S. Pat. No. 3,065,205, involves the electrophilic aromatic substitution (e.g., Friedel-Crafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, Vol. 5, 1967, pp. 2415-2427; Johnson et al., U.S. Pat. Nos. 4,107,837 and 4,175,175. Johnson et al. show that a very broad range of PAE can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK's".

In recent years, there has developed a growing interest in PAEK's as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, Vol. 22, August, pp. 1096-1103; Blundell et al., Polymer 1983, Vol. 24, August, pp. 953-958; Atwood et al., Polymer Preprints, 20, No. 1, April 1979, pp. 191-194; and Rueda et al., Polymer Communications, 1983, Vol. 24, September, pp. 258-260. In early to mid-1970, Raychem Corporation commercially introduced a PAEK called Stilan, a polymer whose acronym is PEK, each ether and keto group being separated by 1,4-phenylene units. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus, PAEK's are well known; they can be synthesized from a variety of starting materials; and they can be made with different melting temperatures and molecular weights. The PAEK's are crystalline, and as shown by the Dahl and Dahl et al. patents, supra, at sufficiently high molecular weights they can be tough, i.e., they exhibit high values ($>50$ ft-lbs/in$^2$) in the tensile impact test (ASTM D-1822). They have potential for a wide variety of uses, but because of the significant cost to manufacture them, they are expensive polymers. Their favorable properties class them in the upper bracket of engineering polymers.

PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEK's by Friedel-Crafts catalysis. In contrast, PAEK's such as PEEK made by nucleophilic aromatic substitution reactions are produced from expensive starting fluoro monomers, and thus would be classed as expensive polymers.

Those poly(aryl ether ketones) exhibit an excellent combination of properties; i.e., thermal and hydrolytic stability, high strength and toughness, wear and abrasion resistance and solvent resistance. Thus, articles molded from poly(aryl ether ketones) have utility where high performance is required. Often, however, in such articles it is important that the crystallinity of the polymer be developed as far as possible during the fabrication process. This is due to the fact that subsequent use of an article which can continue to crystallize in use can result in dimensional changes occuring in the article with consequent warping or cracking and general change in physical properties. Moreover, in some applications, it is important to achieve a uniformity of crystalline texture and to maximize the number of crystallites regardless of increasing the rate of crystallization.

Crystallization rates are even more critical in miscible blends containing a poly(aryl ether ketone) and an amorphous polymer, such as for example, a poly(ether imide) or certain polyimides and poly(amide-imides). The presence of the second polymer component retards crystallization and, hence, the development of optimum toughness, optimum chemical, and heat resistance.

It is, therefore, highly desirable to develop new rapidly crystallizing poly(aryl ether ketone) compositions, while retaining at the same time all of the other attractive features of this class of polymers.

European Patent Application 152,161 describes poly(aryl ether ketones) having high crystallization rates. This is achieved by providing the polymer with ionic end-groups. In another embodiment, fast crystallization is achieved by blending a poly(aryl ether ketone) which does not contain terminal ionic groups with a material having such terminal groups.

U.S. Pat. No. 4,609,714 claims blends of 5 to 95 percent by weight of one poly(aryl ether ketone) with 95 to 5 percent by weight of a second poly(aryl ether ketone). While the patent recognizes that the addition of a higher melting poly(aryl ether ketone) could improve the crystallization kinetics of a lower melting poly(aryl ether ketone), the possibility of using less than 5 percent by weight of the additive to produce fast crystallization was not recognized.

DESCRIPTION OF THE INVENTION

It was now unexpectedly discovered that significantly improved crystallization rates are obtained with compositions comprising (a) at least 98 percent by weight of a poly(aryl ether ketone) or of a miscible blend thereof with a polyetherimide, certain poly(amide-imides) and/or polyimides, wherein the poly(aryl ether ketone) has a melting point no more than about 390° C., and (b) two percent by weight or less of another poly(aryl ether ketone) which poly(aryl ether ketone) has a melting point higher than 400° C.

The discovery that such small amounts of the additive (<2 wt.%) are effective in promoting fast crystallization rates was unexpected. The most remarkable aspect of the discovery, however, was the fact that the same beneficial effect is also observed in miscible blends of the poly(aryl ether ketones). Here, the presence of the second amorphous component was expected to exercize a strong retarding effect on crystallization and, thus, hinder the development of optimum properties of the blend.

It is noted that the additive contains no ionic groups. These groups may have undesirable effects on polymer stability or on other polymer properties.

The second, high melting poly(aryl ether ketone) may be an oligomer (i.e., having molecular weights in the range of 1,000 and up to about 10,000) or a high molecular weight polymer (molecular weights >10,000). Since very small amounts of the additive suffice to yield rapidly crystallizing compositions, its effect on properties is negligible, even when oligomers are used.

The compositions of the instant invention retain their attractive crystallization behavior after prolonged treatment in the melt. It is, of course, necessary to properly select the additive, and to ensure that its $T_m$ be above the melt treatment temperature. Given the wide variety of poly(aryl ether ketones) suitable as crystallization promoters, their $T_m$ requirement is easily met.

The poly(aryl ether ketones) whose crystallization rate is being improved melt no more than about 390° C. and contain essentially ether groups (—O—) joined to keto groups (—CO—) through 1,4-phenylene groups. It is understood that where two carbonyl groups are attached to the same phenylene nucleus, up to 50% of these carbonyl groups can be in position meta with respect to each other. The subject poly(aryl ether ketones) can be generically characterized as containing repeating units of one or more of the following formulae:

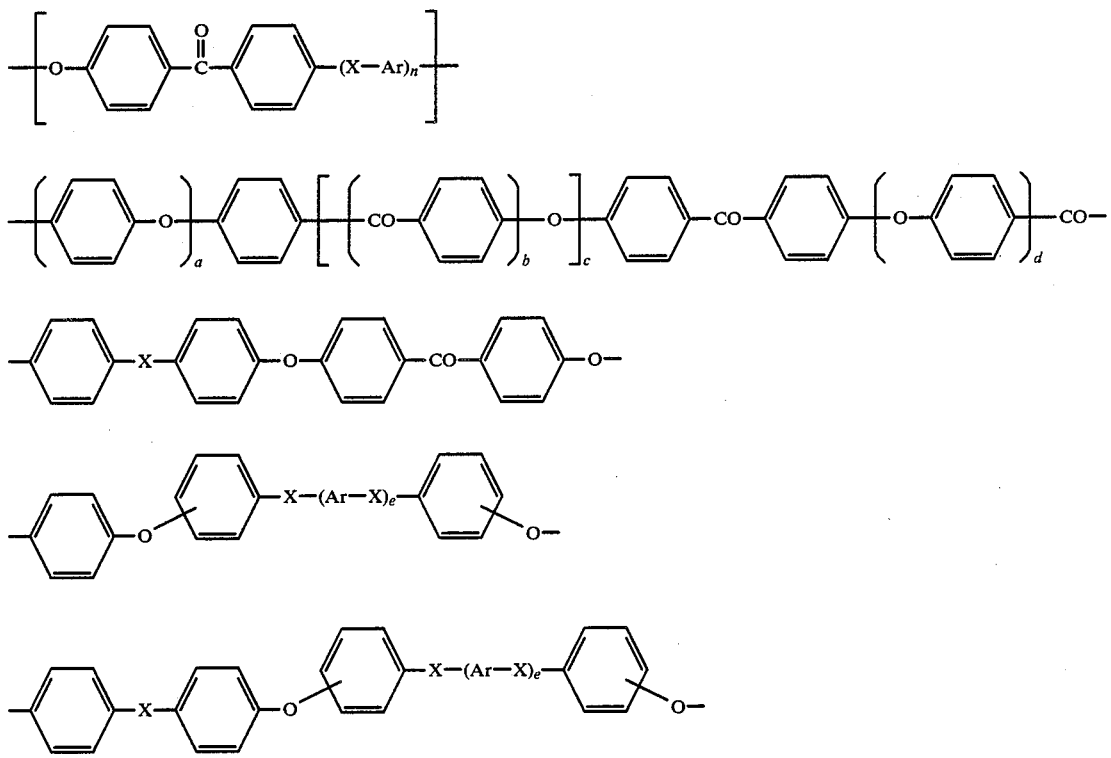

wherein Ar is independently a divalent aromatic radical selected from phenylene, biphenylene, terphenylene, naphthylene or anthracenylene with the proviso that not more than about 20 mole percent of Ar is biphenylene, terphenylene, naphthylene or anthracenylene. X is independently O or $$\overset{O}{\underset{\parallel}{C}},$$

and n is an integer of from 0 to 3; b, c, d and e are 0 to 1 and a is an integer of 1 to 4 and preferably d is 0 when b is 1.

Preferred poly(aryl ether ketones) include those having repeating units of the formula:

$$-O-\phi-\overset{O}{\underset{\parallel}{C}}-\phi-$$

$$-\phi-O-\phi-\overset{O}{\underset{\parallel}{C}}-\phi-O-$$

$$-\phi-O-\phi-\overset{O}{\underset{\parallel}{C}}-\phi-$$

$$-\overset{O}{\underset{\parallel}{C}}-\phi-O-$$

$$-\phi-O-\phi-\overset{O}{\underset{\parallel}{C}}-\phi-\overset{O}{\underset{\parallel}{C}}-$$

$$-\phi-O-\phi-O-\phi-$$

$$-CO-\phi-O-\phi-CO-$$

$$-\phi-CO-\phi-CO-\phi-$$

$$-O-\phi-CO-\phi-O-$$

$$-\phi-O-\phi-O-\phi-$$

$$-CO-\phi-CO-$$

$$-\phi-O-\phi-CO-\phi-$$

$$-O-\phi-CO-\phi-CO-$$

The poly(aryl ether ketones) used as crystallization promoters, melt at temperatures above 400° C. and contain essentially ether groups (—O—) joined to keto groups (—CO—) through units of the formulae (3), (4), (5), and/or (6). In addition to units (3), (4), (5), and/or (6), (3) "biphenylene"

(4) "terphenylene"

(5) hereinafter referred to as "naphthylene"

(6) hereinafter referred to as "anthracenylene"

the ether (—O—) and keto (—CO—) groups may also be joined through 1,4-phenylene groups; with the understanding that where there are two carbonyl groups attached to the same phenylene nucleus, up to 50% of these carbonyl groups may be in the position meta with respect to each other. The subject poly(aryl ketones) can be generically characterized as containing repeating units of one or more of the following formulae:

$$-\!\!\left[\!O-Ar-\overset{O}{\underset{\parallel}{C}}-Ar(X'-Ar)_n\!\right]\!\!-$$

$$-\!\!\left\{\!\left[(Ar-O)_a Ar\!\left(\overset{O}{\underset{\parallel}{C}}-Ar\right)_b O\right]_c\!Ar-\overset{O}{\underset{\parallel}{C}}-Ar(OAr)_d\overset{O}{\underset{\parallel}{C}}\right\}\!-$$

$$-Ar-X'-Ar-O-Ar-\overset{O}{\underset{\parallel}{C}}-Ar-O-$$

$$-Ar-O-Ar-X'-(Ar-X')_e-Ar-O-$$

$$-Ar-X'-Ar-O-Ar-X'-(Ar-X')_e-Ar-O-$$

$$-\!\!\left[\!Ar-\overset{O}{\underset{\parallel}{C}}-(X'-Ar)_n\!\right]\!\!-$$

wherein Ar is independently a divalent aromatic radical such as phenylene, biphenylene, terphenylene, naphthylene, and/or anthracenylene, with the proviso that at least 20 mole percent and preferably at least 50 mole percent of the groups Ar are selected from units (3), (4), (5), and/or (6); X' is independently O,

or a direct bond; and n is an integer of from 0 to 3; b, c, d and e are 0 to 1; and a is an integer of 1 to 4; and preferably d is 0 when b is 1.

Preferred poly(aryl ether ketone) crystallization promoters include those having repeating units of the formulae below, where Ar is as defined above, Ph' is (3), (4), (5), and/or (6) and Ph is phenyl or 1,4-phenylene.

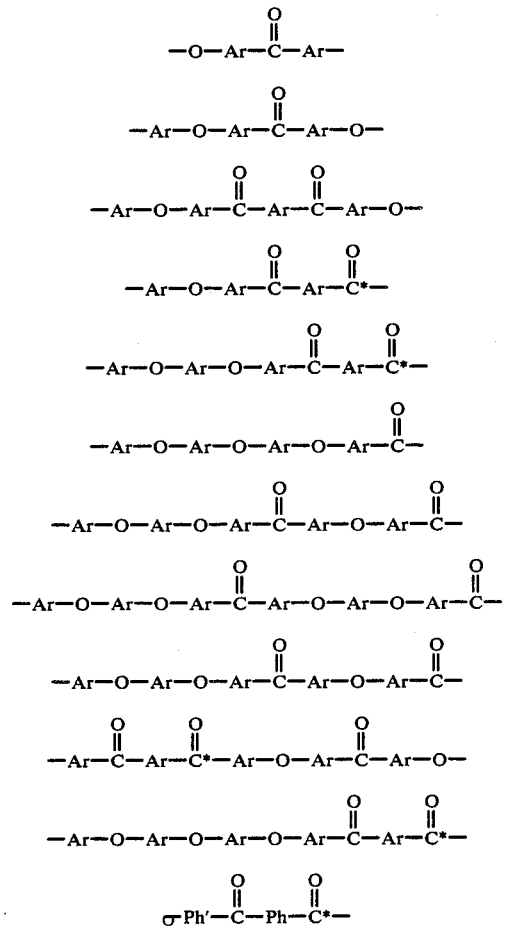

*Up to 50% of the two —C— units may be in the meta position when Ar = phenylene.

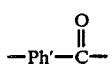

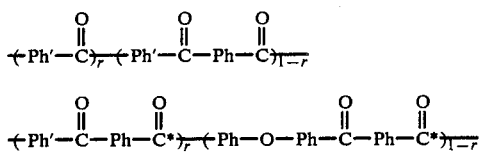

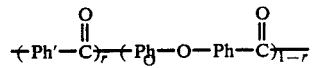

*Up to 50% of the two —C— units may be in the meta position.

where r is less than one; and any other combinations of the units listed above.

The poly(aryl ether ketones) of the instant invention are prepared by methods well known in the art. One such method comprises heating a substantially equimolar mixture of at least one bisphenol and at least one dihalobenzenoid compound and/or at least one halophenol compound.

Preferred bisphenols in such a process include: 4,4'-dihydroxybiphenyl, 2,6-dihydroxy naphthalene, other isomeric dihydroxy naphthalenes, 1,5-dihydroxy anthracene, other isomeric dihydroxy anthracenes, dihydroxy terphenyls, 4,4'-dihydroxybenzophenone, and 4,4'-dihydroxydiphenyl ether.

Diphenols such as hydroquinone may also be used.

Preferred dihalobenzenoid and halophenol compounds include:
4-(4'-chlorobenzoyl)phenol,
4-(4'-fluorobenzoyl)phenol,
4,4'-bis(4"-fluorobenzoyl)diphenyl,
1,5-bis(4'-fluorobenzoyl)naphthalene,
2,6-bis(4'-fluorobenzoyl)naphthalene,
2,7-bis(4'-fluorobenzoyl)naphthalene,
2,6-2,7-bis(4'-fluorobenzoyl)anthracenes,
4,4'-difluorobenzophenone,
4,4'-dichlorobenzophenone,
4-chloro-4'-fluorobenzophenone,
1,4-bis(4'-fluorobenzoyl)benzene,
1,3-bis(4'-fluorobenzoyl)benzene, and
4,4'-bis(4"-fluorobenzoyl)diphenylether.

The poly(aryl ether ketones) may be produced by the process as described in, for example, U.S. Pat. No. 4,176,222. This process comprises heating in the temperature range of 10° to 400° C.,
(a) a substantially equimolar mixture of
(i) at least one bisphenol, and
(ii) at least one dihalobenzenoid compounds, and/or
(b) at least one halophenol, in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Also poly(aryl ether ketones) such as those containing repeating units of the formula

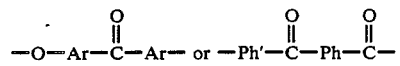

where Ar, Ph and Ph' are as defined previously, may be produced by Friedel-Craft reactions utilizing hydrogen fluoride-boron trifluoride catalysts as described, for example, in U.S. Pat. Nos. 3,953,400; 3,441,538, 3,442,857 and 3,516,966.

The polyketones may also be prepared according to the process as described in, for example, U.S. Defensive Publication No. T 103,703 and U.S. Pat. No. 4,396,755. In such processes, reactants such as (a) an aromatic monocarboxylic acid;

(b) a mixture of at least one aromatic dicarboxylic acid and an aromatic hydrocarbon; and (c) combinations of (a) and (b) are reacted in the presence of a fluoroalkane sulphonic acid, particularly trifluoromethane sulphonic acid.

The poly(aryl ether ketones) of the following formulae:

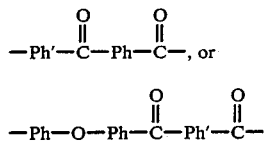

may also be prepared according to the process as described in U.S. Pat. No. 4,398,020. In such a process, (a) a mixture of substantially equimolar amounts of
(i) at least one aromatic diacyl halide of formula

where $-Ar_1-$ is a divalent aromatic radical, such as 1,4-phenylene; 4,4'-biphenylene, terephenylene, naphthylene, anthracenylene, and the like; Y is halogen, preferably chlorine; and COY is an aromatically bound acyl halide group, which diacyl halide is polymerizable with at least one aromatic compound of (a) (ii), and (ii) at least one aromatic compound of the formula

wherein H—Ar'—H is an aromatic compound such as biphenyl, terphenyl, naphthalene, anthracene, or diphenyl ether, and H is an aromatically bound hydrogen atom, which compound is polymerizable with at least one diacyl halide of (a) (i), or (b) at least one aromatic monacyl halide of the formula

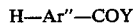

where H—Ar"—H is a divalent aromatic compound such as biphenyl, terphenyl, naphthalene, anthracene, diphenoxybiphenyl, diphenyl ether, diphenoxy-naphthalene, diphenoxy-anthracene, and diphenoxybenzene, and H is an aromatically bound hydrogen atom, Y is halogen, preferably chlorine, and COY is an aromatically bound acyl halide group, which monoacyl halide is self-polymerizable, or (c) a combination of (a) and (b) is reacted in the presence of a fluoroalkane sulphonic acid.

Additionally, the polymers may be prepared by Friedel-Crafts processes as described in, for example, U.S. Pat. Nos. 3,065,205; 3,419,462; 3,441,538; 3,442,857; 3,516,966 and 3,666,612. In these patents, a PAEK is produced by Friedel-Crafts polymerization techniques using Friedel-Crafts catalysts such as aluminum trichloride, zinc chloride, ferric bromide, antimony pentachloride, titanium tetrachloride, etc. and a solvent.

Specifically, the polymers may be prepared by reacting diphenyl ether, biphenyl, terphenyl, naphthalene, or anthracene, and, optionally, in addition to the above, any of the well-known aromatic co-reactants such as
diphenyl sulfide, dibenzofuran,
thianthrene, phenoxathin,
dibenzodioxine, phenodioxin,
diphenylene, 4,4'-diphenoxbiphenyl,
xanthone, 2,2'-dipheoxybiphenyl,
diphenyl methane, 1,4-diphenoxybenzene,
1,3-diphenoxybenzene, 1-phenoxynaphthalene,
1,2-dipheoxynaphthalene, diphenoxybenzophenone,
diphenoxy dibenzoyl benzene, 1,5-diphenoxynaphthalene,
1-pheoxyanthracene, 1,5-dipheoxyanthracene,
1,6-diphenoxyanthracene, and the like.

Similarly, the following compounds are diacyl halides which may be used as reactants:
terephthaloyl chloride, isophthaloyl chloride,
thio-bis(4,4'-benzoyl chloride),
benzophenone-4,4'-di(carbonyl chloride),
oxy-bis(3,3'-benzoyl chloride),
diphenyl-3,3'-di(carbonyl chloride),
carbonyl-bis(3,3'-benzoyl chloride),
sulfonyl-bis(4,4'-benzoyl chloride),
sulfonyl-bis(3,3'-benzoyl chloride),
sulfonyl-bis(3,4'-benzoyl chloride),
thio-bis(3,4'-benzoyl chloride),
diphenyl-3,4'-di(carbonyl chloride),
oxy-bis[4,4'-(2-chlorobenzoyl chloride)],
naphthalene-1,6-di(carbonyl chloride),
naphthalene-1,5-di(carbonyl chloride),
naphthalene-2,6-di(carbonyl chloride),
oxy-bis[7,7'-naphthalene-2,2'-di(carbonyl chloride)],
thio-bis[8,8'-naphthalene-1,1'-di(carbonyl chloride)],
7,7'-binaphthyl-2,2'-di(carbonyl chloride),
diphenyl-4,4'-di(carbonyl chloride),
carbonyl-bis[7,7'-naphthalene-2,2'-di(carbonyl chloride)],
sulfonyl-bis[6,6'-naphthalene-2,2'-di(carbonyl chloride)],
dibenzofuran-2,7-di(carbonyl chloride),
anthracene-1,5-di(carbonyl chloride) and the like.

Illustrative of suitable acyldihalides include carbonyl chloride (phosgene), carbonyl bromide, carbonyl fluoride and oxaloyl chloride.

Preferably, diphenyl ether, biphenyl, terphenyl, naphthalene, anthracene, the diphenoxy derivatives of the above and/or the diphenoxybenzenes are reacted with terphthaloyl chloride, isophthaloyl chloride and/or phosgene.

Self condensation of aromatic monoacyl halides of the formula:

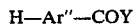

wherein Ar" and COY are as defined previously is yet another route to the poly(aryl ether ketones). Preferred Ar" are diphenyl ether diyl, biphenylyl, terphenylyl, naphthylene, anthracenylene, the diphenoxy benzene diyls and the aromatic divalent radicals obtained from the diphenoxy derivatives of biphenyl, terphenyl, naphthalene and anthracene.

The preferred Friedel-Crafts catalysts are aluminum chloride, antimony pentachloride and ferric chloride. Other Friedel-Crafts catalysts, such as aluminum bromide, boron trifluoride, zinc chloride, antimony trichloride, ferric bromide, titanium tetrachloride, and stanic chloride, can also be used. In the preferred embodiment, excess of up to 100 mole percent of the acid catalyst is used.

The polymerization is generally carried out in the presence of a solvent. The preferred organic solent is 1,2-dichloroethane. Other solvents such as symmetrical tetrachloroethane, o-dichlorobenzene, hydrogen fluoride, methylene chloride, trichloromethane, trichloroethylene, or carbon disulfide may be employed. Co-solvents such as nitromethane, nitropropane, dimethyl formamide, sulfolane, etc. may be used. Concentrations as low as 3 to as high as 40 weight percent may be used.

The reactions may be carried out over a range of temperatures which are from about $-40°$ C. to about $160°$ C. In general, it is preferred to carry out the reactions at a temperature in the range of $-10°$ C. to about $30°$ C. In some cases it is advantageous to carry out the reactions at temperatures above $30°$ C. or below $-10°$ C. Most preferably, the reactions are carried out at temperatures below about $0°$. The reactions may be carried out at atmospheric pressure although higher or lower pressures may be used. Reaction times vary depending on the reactants, etc. Generally, reaction times of up to 6 hours and longer are preferred.

The term poly(aryl ether ketone) as used herein is meant to include homopolymers, copolymers, terpolymers, graft copolymers, and the like.

The poly(aryl ether ketones) have a reduced viscosity of at least about 0.4 to about 5.0 dl/g, as measured in concentrated sulphuric acid at 25° C. (1 gm of polymer) 100 ml of acid.

The crystallization rates of miscible blends, containing a poly(aryl ether ketone) melting at no more than about 390° C. and another polymer, can also be increased by the addition of the high melting ($T_m > 400°$ C.) poly(aryl ether ketone). Again, very small amounts (<2 weight percent) of the additive are sufficient to yield a dramatic improvement. Blends containing any polymer that is miscible with the poly(aryl ether ketone) are useful. Of particular interest are mixtures that contain polyetherimides, certain poly(amide-imides) or certain polyimides.

The polyetherimides suitable for use in this invention are well known in the art and are described in, for example, U.S. Pat. Nos. 3,847,867; 3,838,097; and 4,107,147.

The polyetherimides are of formula (7):

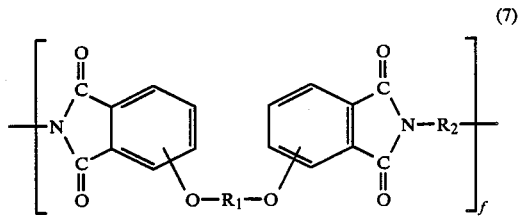
(7)

wherein f is an integer greater than 1, preferably from about 10 to about 10,000 or more; —O—$R_1$—O— is attached to the 3 or 4 and 3' or 4' positions and $R_1$ is selected from (a) a substituted or unsubstituted aromatic radical such as:

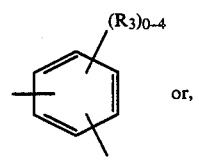

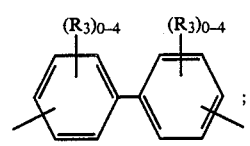

(b) a divalent radical of the formula:

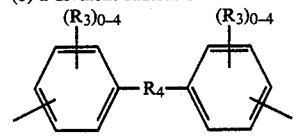

wherein $R_3$ is independently $C_1$ to $C_6$ alkyl, aryl or halogen and $R_4$ is selected from —O—, —S—,

—$SO_2$—, —SO—, alkylene of 1 to 6 carbon atoms, cycloalkylene of 4 to 8 carbon atoms, alkylidene of 1 to 6 carbon atoms, or cycloalkylidene of 4 to 8 carbon atoms; $R_2$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and $C_2$ to $C_8$ alkylene terminated polydiorganosiloxane or a divalent radical of the formulae

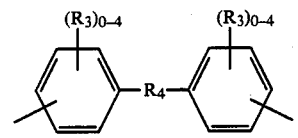

or

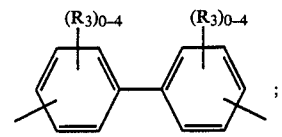

wherein $R_3$ and $R_4$ are as previously defined.

The polyetherimides may also be of the following formula:

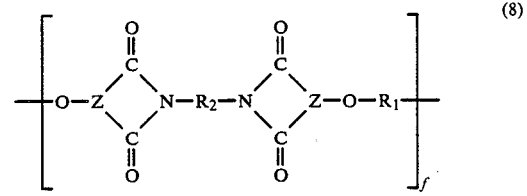
(8)

wherein —O—Z is a member selected from

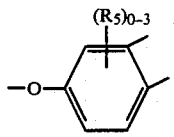

wherein R$_5$ is independently hydrogen, lower alkyl or lower alkoxy

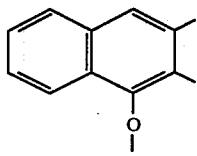

or isomers thereof and

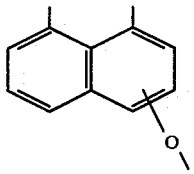

or isomers thereof wherein the oxygen may be attached to either ring and located ortho or para to one of the bonds of the imide carbonyl groups, and wherein R$_1$ and R$_2$ and f are as previously defined.

These polyetherimides are prepared by methods well known in the art as set forth in, for example, U.S. Pat. Nos. 3,833,544; 3,887,588; 4,017,511; 3,965,125; and 4,024,110.

The polyetherimides of formulae (7) and (8) can, for example, be obtained by any of the methods well known to those skilled in the art including the reaction of any aromatic bis(ether anhydride)s of the formula:

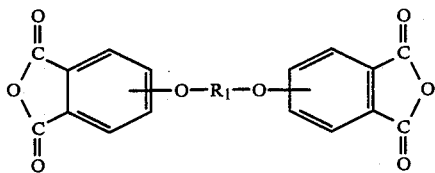

(9)

wherein R$_1$ is as defined hereinbefore, with a diamino compound of the formula

(10)

wherein R$_2$ is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and diamines, at temperatures of from about 20° to about 250° C. Alternatively, the polyetherimides can be prepared by melt polymerization of any dianhydrides of formula (9) with any diamino compound of formula (10) while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerizations can be employed. The conditions of the reaction and the proportions of ingredients can be varied widely depending on the desired molecular weight, intrinsic viscosity, and types of ingredients used. In general, equimolar amounts of diamine and dianhydride are employed for high molecular weight polyetherimides, however, in certain instances, a slight molar excess (about 1 to 5 mole percent) of one of the reagents can be employed. Polyetherimides of formula (7) having an intrinsic viscosity of greater than 0.2 deciliters per gram, preferably 0.35 to 0.60, or 0.7 deciliters per gram or even higher when measured in m-cresol at 25° C., are the most useful.

The aromatic bis(ether anhydride)s of formula (9) include, for example:

2,2-bis[4-(2,3-dicarboxyphenoxy)phenyl]-propane dianhydride;

4,4'-bis(2,3-dicarboxyphenoxy)diphenyl ether dianhydride;

1,3-bis(2,3-dicarboxyphenoxy)benzene dianhydride;

4,4'-bis(2,3-dicarboxyphenoxy)diphenyl sulfide dianhydride;

1,4-bis(2,3-dicarboxyphenoxy)benzene dianhydride;

4,4'-bis(2,3-dicarboxyphenoxy)benzophenone dianhydride;

4,4'-bis(2,3-dicarboxyphenoxy)diphenyl sulfone dianhydride;

2,2'-bis[4-(3,4-dicarboxyphenoxy)phenyl]propane dianhydride;

4,4'-bis(3,4-dicarboxyphenoxy)diphenyl ether dianhydride;

4,4'-bis(3,4-dicarboxyphenoxy)diphenyl sulfide dianhydride;

1,3-bis(3,4-dicarboxyphenoxy)benzene dianhydride;

1,4-bis(3,4-dicarboxyphenoxy)benzene dianhydride;

4,4'-bis(3,4-dicarboxyphenoxy)benzophenone dianhydride;

4-(2,3-dicarboxyphenoxy)-4'-(3,4-dicarboxyphenoxy)diphenyl-2,2-propane dianhydride; etc., and mixtures of such dianhydrides.

The organic diamines of formula (10) include, for example, m-phenylenediamine, p-phenylenediamine,
2,2-bis(p-aminophenyl)propane,
4,4'-diaminodiphenyl-methane,
4,4'-diaminodiphenyl sulfide,
4,4'-diaminodiphenyl sulfone,
4,4'-diaminodiphenyl ether,
1,5-diaminonaphthalene,
3,3'-dimethylbenzidine, and
3,3'-dimethoxybenzidine; or mixtures of such diamines.

The polyetherimides of formulae (7) and (8) may also be prepared by effecting reaction in the presence of a dipolar aprotic solvent of a mixture of ingredients comprising, (a) a bis(nitrophthalimide) of the general formula:

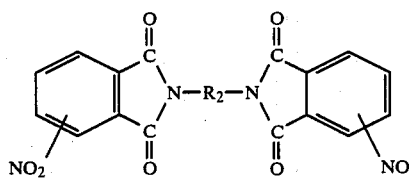

(11)

wherein $R_2$ is defined as hereinabove, and (b) an alkali metal salt of an organic compound of the general formula:

 (12)

wherein M is an alkali metal and $R_1$ is defined as hereinabove.

The bis(nitrophthalimide) used in preparing the polymer is formed by reacting an diamine of the formula described above, $NH_2-R_2-NH_2$, with a nitro-substituted aromatic anhydride of the formula:

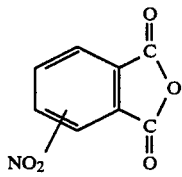 (13)

The molar ratio of diamine to anhydride should ideally be about 1:2 respectively. The initial reaction product is a bis(amideacid) which is subsequently dehydrated to the corresponding bis(nitrophthalimide).

The diamines are described, supra.

The preferred nitrophthalic anhydrides useful in the present invention are 3-nitrophthalic anhydride, 4-nitrophthalic anhydride and mixtures thereof. These reactants are commercially available in reagent grade. They may also be prepared by the nitration of phthalic anhydride using procedures described in Organic Syntheses, Collective Vol. I, Wiley (1948), page 408. Certain other closely related nitroaromatic anhydrides may also be used in the reaction and are illustrated for example by 2-nitronaphthalic anhydride, 1-nitro-2,3-naphthalene-dicarboxylic anhydride and 3-methoxy-6-nitrophthalic anhydride, and the like.

With reference to the alkali metal salts of formula (12) among the divalent carbocyclic aromatic radicals which $R_1$ may represent (mixtures of such radicals are also included) of particular interest are, for instance, the divalent aromatic hydrocarbon radicals having from 6 to 20 carbon atoms, such as phenylene, biphenylene, naphthylene, etc. Included are residues of, e.g., hydroquinone, resorcinol, chlorohydroquinone, etc. In addition, $R_1$ may be a residue of a dihydroxyl diarylene compound in which the aryl nuclei are joined by either an aliphatic group, a cycloaliphatic group, a sulfoxide group, sulfonyl group, sulfur, carbonyl group, oxygen, a chemical bond, etc. Typical of such diarylene compounds are the following:

2,4-dihydroxydiphenylmethane,
bis(2-hydroxyphenyl)methane,
2,2-bis(4-hydroxyphenyl)propane,
bis(4-hydroxyphenyl)methane,
bis(4-hydroxy-5-nitrophenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(2,5-dimethyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(4-hydroxynaphthyl)propane;
the naphthalene diols; and
bis(4-hydroxyphenyl)ether,
bis(4-hydroxphenyl)sulfide,
bis(4-hydroxphenyl)sulfone, and the like.

When dialkali metal salts of formula (12) are used with the compound illustrated by formula (11), the ingredients are advantageously present in an equal molar ratio for optimum molecular weight and properties of the polymer. However, slight molar excesses, e.g., about 0.001 to 0.10 molar excess of either the dinitro-substituted organic compound or of the dialkali metal salt of formula (12) may be employed. When the molar ratios are approximately equal, the polymer is substantially terminated by the end group $Z-NO_2$ at one end and by a phenolic group at the other end. If there is a molar excess of one compound, that particular terminal group will predominate.

The conditions of reaction whereby the alkali-metal salt of formula (12) is reacted with the dinitro-substituted organic compound of formula (11) can be varied widely. Generally, temperatures of the order of about 25° to about 150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield and desired molecular weight. Thereafter the reaction product can be treated in the appropriate manner required to effect precipitation and/or separation of the desired polymeric reaction product. Generally, common solvents such as alcohols (e.g., methanol, ethanol, isopropyl, isopropyl alcohol, etc.) and aliphatic hydrocarbons (e.g., pentane, hexane, octane, cyclohexane, etc.) may be employed as precipitants for this purpose.

It is important that the reaction between the dinitro-substituted organic compound of formula (11) and the alkali-metal salt of formula (12) (mixtures of such alkali-metal salts can also be used) be carried out in the presence of a dipolar aprotic solvent.

The polymerization is performed under anhydrous conditions usually using dipolar aprotic solvents such as dimethylsulfoxide which are added in varying amounts depending upon the particular polymerization. A total quantity of solvent, dipolar aprotic solvent or mixture of such solvent with an aromatic solvent sufficient to give a final solution containing 10 to 20 percent by weight of polymer is preferably employed.

The preferred polyetherimides include those having repeating units of the following formula:

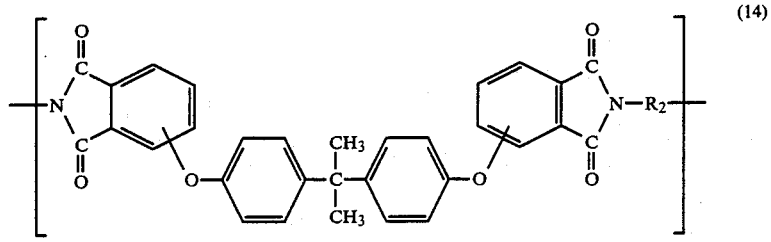

where $R_2$ is selected from

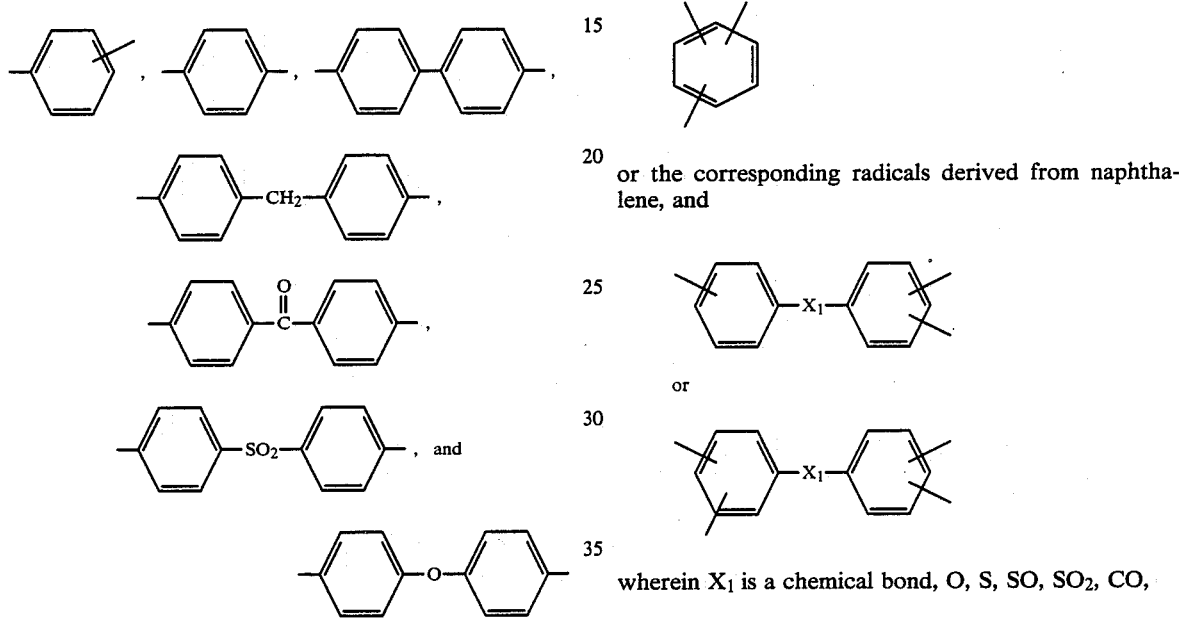

or the corresponding radicals derived from naphthalene, and

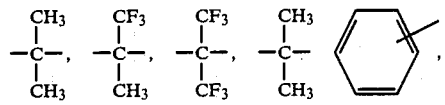

or

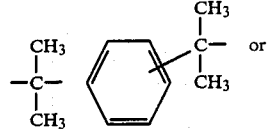

wherein $X_1$ is a chemical bond, O, S, SO, $SO_2$, CO,

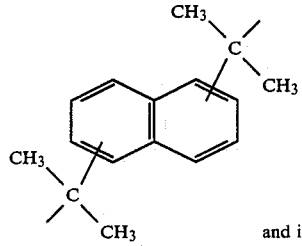

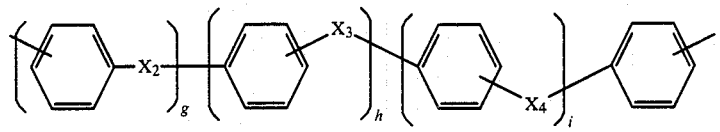

and isomers thereof.

The polyetherimide where $R_2$ is meta-phenylene is most preferred.

The poly(amide-imides) or polyimides useful in the instant invention contain isoalkylidene, preferably isopropylidene bridges and are derived from at least one polycarboxylic acid or derivative thereof having the formula:

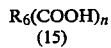
(15)

and/or from at least one diamine having the formula:

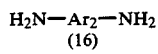
(16)

In the formulae above, n can be 3 or 4; $R_6$ is a tri-, or tetravalent aromatic radical, preferably Ar is the radical and/or the radical

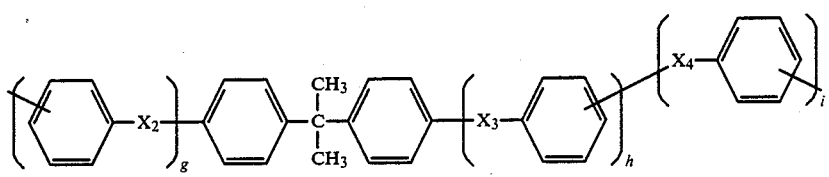

wherein g, h, and i are independently 0 and 1, and wherein $X_2$, $X_3$, and $X_4$ may independently take on the same values as $X_1$.

Within the scope of this invention, preferred polyimides are represented by the formula

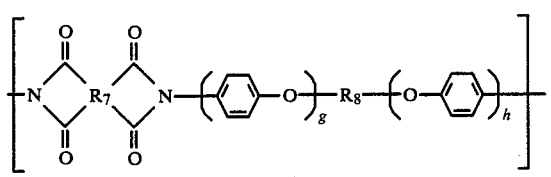

wherein $R_7$ is

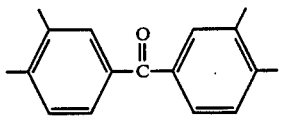

and $R_8$ is

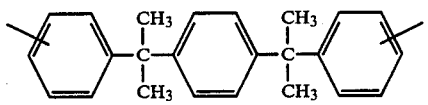

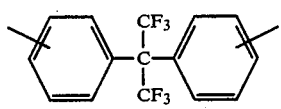

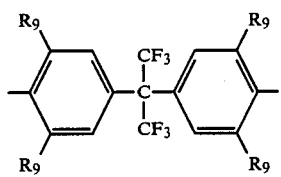

or

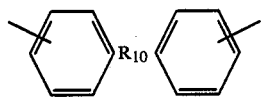

and g and h are 0 or 1 and may be the same or different, $R_9$ is a $C_1$ to $C_5$ alkyl radical, and $R_{10}$ is a divalent, saturated or unsaturated aliphatic hydrocarbon radical, particularly an alkylene or alkylidene radical having 1 to 3 carbon atoms or a cycloalkylidene or cycloalkylene radical having up to and including 9 carbon atoms, and/or at least one thermoformable polyimide made from the following dianhydride:

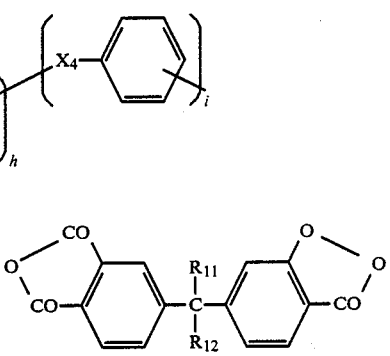

where $R_{11}$ and $R_{12}$ are $CF_3$ or $CH_3$ and may be the same or different.

The imide containing polymers can be homopolymers, random copolymers, and block copolymers. Moreover, according to the instant invention, the polyimide or polyamide-imide should contain at least 3 percent by weight, and preferably 7 percent by weight of isoalkylidene, preferably isopropylidene bridges.

It should be noted that the imide containing polymers may be based on more than one diamine and/or on more than one polycarboxylic acid.

The polymers are prepared by methods well known in the art. The preparation of the imide-containing materials is set forth, for example, in U.S. Pat. Nos. 3,208,458; 3,652,409; 3,179,634; 3,972,902; 3,355,427; 4,485,140; and 4,111,906. The polyimides may be prepared, for example, by reacting at temperatures ranging from ambient to about 175° C., an organic diamine with a tetracarboxylic acid dianhydride. Alternatively, a tetracarboxylic acid dianhydride can be reacted with a diisocyanate, in place of the diamine. Reaction of an isocyanate with the anhydride group yields a seven membered cyclic intermediate which spontaneously collapses to form the imide with evolution of carbon dioxide. Similar reactions are used for the preparation of the poly(amide-imides) except that a tricarboxylic acid monoanhydride or derivative thereof is used instead of the tetracarboxylic acid dianhydride.

In addition to the reaction of a diamine with a tricarboxylic acid monoanhydride or derivative thereof, the poly(amide-imides) of the instant invention may also be prepared via the routes shown in equations (I)-(IV). The chemistry of these routes is the same as that described above for the preparation of the poly(amide-imides), and polyimides. Note that the terms dicarboxylic acid, tricarboxylic acid monoanhydride, and diamine are meant to include appropriately reactive derivatives thereof as required for the polymerizations. Thus, the term dicarboxylic acid includes also, the corresponding acid chloride; the term diamine includes also, the corresponding di-N-acylated derivative. These latter materials were shown to be very useful for the preparation of poly(amide-imides) . . . see Keske, Polymer Preprints, Vol. 25, No. 2, p. 12 (1984).

Dianhydride of a + dicarboxylic acid + diamine ⟶ poly(amide-imide)  (I)
tetracarboxylic
acid Tricarboxylic acid + dicarboxylic acid + diamine ⟶ poly(amide-imide)   (II)
monoanhydride Tricarboxylic acid + dianhydride of a + diamine ⟶ poly(amide-imide)   (III)
monoanhydride    tetracarboxylic
                 acid Tricarboxylic acid + dianhydride of a + dicarboxylic acid + diamine ⟶ poly(amide-imide).   (IV)
monoanhydride    tetracarboxylic
                 acid The materials useful in equations (I)–(IV) are $R_6(COOH)_n$ and $H_2N\ Ar_2\ NH_2$ wherein $R_6$, $Ar_2$, and n are as defined above. An additional reactant is the dicarboxylic acid $R_{13}(COOH)_2$ wherein $R_{13}$ is

[structure: substituted benzene]

and/or

[structure: biphenyl with $X_1$ bridge]

and where $X_1$ is as defined above. As indicated before, the imide containing polymers which show the unusual and unexpected ability for form compatible blends with poly(aryl ether ketones) are based on monomers that possess isopropylidene bridges within their molecules. At least one of the reactants, i.e., either the polycarboxylic acid or the diamine must contain a group:

$$-\underset{\underset{CH_3}{|}}{\overset{\overset{CH_3}{|}}{C}}-$$

Note that in addition to $R_6(COOH)_n$, $R_{13}(COOH)_2$ and $H_2N\ Ar_2\ NH_2$ as defined above, the reactants may comprise up to 50 mole percent, preferably up to 25 mole percent, and most preferably not more than about 15 mole percent of other polycarboxylic acid and/or diamine components, such as pyromellitic dianhydride, for example.

As indicated above, the amide- and imide-based polymers that are useful in the instant invention are prepared from monomers that contain isoalkylidene, preferably isopropylidene bridges. The starting materials for the preparation of these monomers are typically the derivatives (17) or preferably (18).

$$\underset{CH_2}{\overset{R_{14}}{\diagdown}}C-Ar_3-C\underset{CH_2}{\overset{R_{14}}{\diagup}}$$   (17)

$$\underset{CH_2}{\overset{CH_3}{\diagdown}}C-Ar_3-C\underset{CH_2}{\overset{CH_3}{\diagup}}$$   (18)

In the formulae above, $R_{14}$ is an alkyl group having from 1 to 10 carbon atoms and is preferably methyl; $Ar_3$ is

[structure: substituted benzene or biphenyl with $X_5$ bridge]

where $X_5$ is a chemical bond, O, SO, $SO_2$, $$\overset{O}{\underset{}{\overset{\|}{C}}},$$

$CH_2$, or an alkylidene group having from 2 to 8 carbon atoms; or

[structure: naphthalene]

or isomers thereof.

The acid-catalyzed condensation of (17) or of (18) with aniline leads to the desired diamino monomers. Friedel-Crafts reaction of (17) or of (18) with e.g., o-xylene, followed by oxidation and dehydration yields dianhydrides containing isoalkylidene or isopropylidene bridges. Similar approaches can be used to prepare the tricarboxylic acid monoanhydrides having isoalkylidene or isopropylidene groups within their molecules.

The compositions of this invention are prepared by any conventional mixing methods. For example, a preferred method comprises mixing the poly(aryl ketone) or poly(aryl ether ketone) blend with the high melting poly(aryl ether ketone) additive in powder or granular form in an extruder and extruding the mixture into strands, chopping the strands into pellets and molding the pellets into the desired article.

The compositions of this invention may include mineral fillers such as carbonates including chalk, calcite and dolomite; silicates including mica, talc, wollastonite, silicon dioxide; glass spheres; glass powders, aluminum; clay; quartz; and the like. Also, reinforcing fibers such as fiberglass, carbon fibers, and the like may be used. The compositions may also include additives such as titanium dioxide; thermal stabilizers, ultraviolet light stabilizers, plasticizers, and the like.

The blends of this invention may be fabricated into any desired shape, i.e., moldings, coatings, films, or fibers. They are particularly desirable for use as electrical insulation for electrical conductors.

EXAMPLES

The following examples serve to give specific illustrations of the practice of this invention but they are not intended in any way to limit the scope of this invention.

DESCRIPTION OF THE POLY(ARYL ETHER KETONES)

Poly(aryl ether ketone) (I)
Poly(aryl ether ketone) (I) was of the formula:

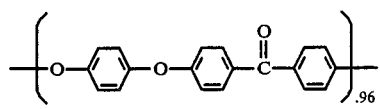

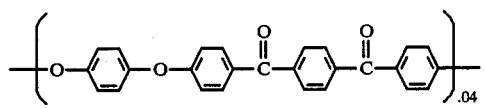

The resin had a melt flow index of 10 g/10 minutes at 400° C. and 44 psi. Its melting point is listed in Table I.

Poly(aryl ether ketone) (II)
Poly(aryl ether ketone) (II) was Vicrex 380G PEEK

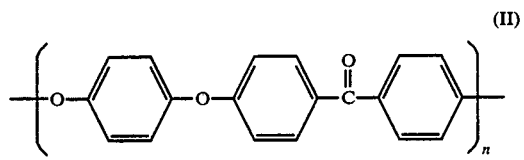
(II)

obtained from ICI Americas, Inc. The resin had a melt flow index of 5 g/10 minutes at 44 psi and 400° C. Its melting point is shown in Table I.

Poly(aryl ether ketone) (III)
Poly(aryl ether ketone) (III) was Victrex 450G PEEK,

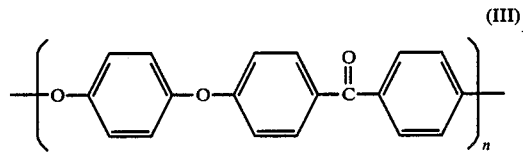
(III)

obtained from ICI Americas, Inc. The resin had a melt flow index of 3 g/10 minutes at 44 psi and 400° C. Its melting point is shown in Table I.

Poly(aryl ether ketones) (IV–(V)
A series of poly(aryl ether ketones) of the following general structure

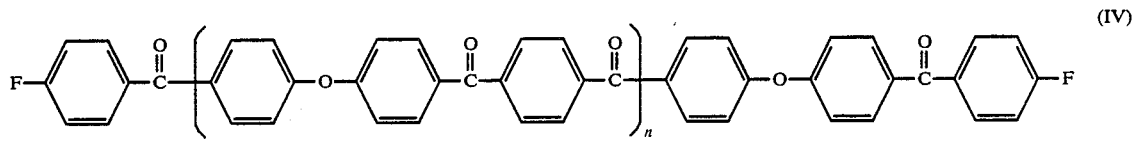
(IV)

(aryl ether ketone)

were prepared as follows:

Poly(aryl ether ketone) (IV)
Poly(aryl ether ketone) (IV) in which n was an average of 2, was synthesized in a 1000 ml, 4-neck flask fitted with a mechanical stirrer, nitrogen inlet, solid addition funnel, thermometer, Claisen adapter, reflux condenser, and gas outlet connected to an aqueous sodium hydroxide scrubber. The apparatus was purged with nitrogen and while under a positive flow, was charged with 429 ml 1,2-dichloroethane,
34.04 g (0.200 mole) diphenyl ether,
27.20 g (0.134 mole) terephthaloyl chloride, and
21.25 g (0.134 mole) p-fluorobenzoyl chloride.

The mixture was then cooled to 0° C. as 107.20 g (0.804 mole) of aluminum trichloride was added as a solid at such a rate as not to exceed 5° C. After six hours at 0° C. the viscous, deep red, heterogeneous solution was added slowly to a stirring solution of methanol/H$_2$O (1:1 V:V) (1000 ml). The resultant finely dispersed slurry was stirred at room temperature for 15 minutes, filtered, and air dried. The off-white powder was then added to 5% HCl (700 ml) and refluxed for two hours, filtered, washed in a blender with distilled water (two times using 500 ml each time) and methanol (two times using 500 ml each time), filtered and then dried in a vacuo at 100° C. for 16–24 hours. The final reduction in aluminum level was performed in the following manner. The oligomer was suspended in 10 times its weight of a 10 percent by weight solution of 2,4-pentanedione in acetone. The suspension was refluxed for two hours, cooled and filtered. The oligomer was suspended in 2,4-pentanedione. Ten mls. of 2,4-pentanedione were used per gram of oligomer. The suspension was refluxed for two hours, cooled and filtered. The precipitate was washed thoroughly with acetone and dried under house vacuum (approximately 20 minutes), at 100° C. for 16–24 hours.

Poly(aryl ether ketone) (V)
Poly(aryl ether ketone) (V) in which the average n was approximately 20 was prepared in a 1000 ml flask fitted with a mechanical stirrer, nitrogen sparge tube, thermometer reflux condenser, and gas outlet connected to an aqueous sodium hydroxide trap. The apparatus was purged with nitrogen and while under a positive pressure, was charged with 700 ml 1,2-dichloroethane,
1.02 g (0.005 mole) isophthaloyl chloride,
19.29 g (0.095 mole) terephthaloyl chloride,
17.87 g (0.105 mole) diphenyl ether, and
1.59 g (0.010 mole) p-fluorobenzoyl chloride.

The mixture was cooled to 0° C. as 56.00 (0.420 mole) aluminum trichloride was added at such a rate as not to exceed 5° C. After six hours at 0° C., the heterogeneous slurry was allowed to warm to room temperature and continued stirring for an additional 17 hours. The excess solvent was decanted and the precipitate was added to dilute aqueous acid (3000 ml of H$_2$O/100 ml concentrated HCl), and heated to reflux for two hours with removal of the 1,2-dichloroethane. The suspension was filtered and the obtained precipitate was refluxed in 700 ml of 5 percent aqueous hydrochloric acid for two hours, filtered, and washed at room temperature twice with distilled water (each wash: 500 ml of water), and twice with methanol (each wash: 500 ml of methanol). It was then dried in a vacuum oven at 100° C. for 24 hours. The final reduction in the aluminum level of the material was performed in a manner similar to that used for the Poly(aryl ether ketone) (IV).

The melting points of the Poly(aryl ether ketones) (IV), and (V) are listed in Table I. Note that the Poly(aryl ether ketone) (IV) exhibited more than one melting point.

Poly(aryl ether ketone) (VI) was of the following structure:

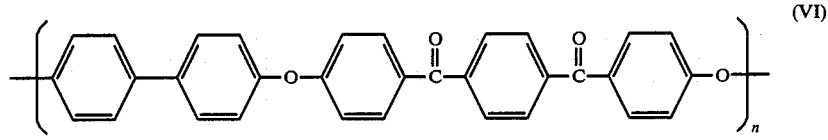

and had an RV of 0.42 dl/g as measured at 25° C. in 96 percent sulfuric acid solution (1 weight percent polymer solution). Its melting point is shown in Table I. It was made by the following method.

A 250 ml flask was fitted with a mechanical stirrer, nitrogen inlet, thermocouple-controller, Dean Stark trap with a condenser and an addition funnel. The flask was charged with:

17.73 g (0.055 mole) 1,4-bis-(4-fluorobenzoyl)benzene,
9.31 g (0.050) 4,4'-dihydroxy biphenyl,
5.14 g (0.048 mole) sodium carbonate,
0.35 g (0,003 mole) potassium carbonate, and
70.3 g diphenyl sulfone.

After complete displacement of air with nitrogen, 20 ml of xylene were added as the flask was heated to 200° C. for one hour, 250° C. for 15 minutes and 320° C. for 30 minutes. This was followed by the addition of 1.61 g (0.005 mole) 1,4-bis(4-fluorobenzoyl)benzene. After 15 additional minutes at 320° C., the reaction mixture was poured into a stainless steel pan, allowed to solidify, and ground finely. The product was then refluxed twice in acetone (2.5 hours, 700 ml of acetone each time), once in 2 percent aqueous hydrochloric acid (1.5 hours, 700 ml of Aq.HCl), once in water (1.5 hours, 700 ml of water) and again once in acetone (1.5 hours, 700 ml of acetone). The final product was then dried in a vacuum oven at 100° C. for 24 hours.

Poly(aryl ether ketone) (VII)
Poly(aryl ether ketone) (VII) was of the following structure:

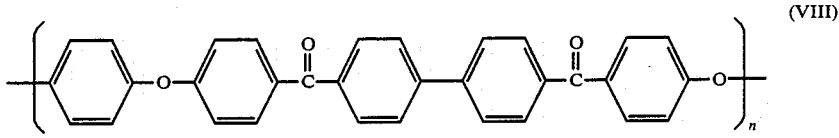

and had an RV of 0.34 dl/g as measured at 25° C. in 96 percent sulfuric acid solution (1 weight percent polymer solution). Its melting point is shown in Table I. It was made by the following method.

A 250 flask was fitted with a mechanical stirrer, nitrogen inlet, thermocouple-controller, Dean Stark trap with a condenser and an addition funnel. The flask was charged with:

21.91 g (0.055 mole) 4,4'-bis-(4-fluorobenzoyl) biphenyl,
9.31 g (0.050 mole) 4,4'-dihydroxy biphenyl,
5.14 g (0.048 mole) sodium carbonate,
0.35 g (0.003 mole) potassium carbonate,
82.00 g diphenyl sulfone.

After complete displacement of air with nitrogen, 20 ml of xylene were added as the reactor was heated to 200° C. for one hour, 250° C. for 15 minutes, and 320° C. The reaction mixture was maintained at 320° C. for 30 minutes, followed by addition of 1.61 g (0.005 mole) of 1,4-bis-(4-fluorobenxoyl) benzene. After 15 minutes, the reaction mixture was poured into a stainless steel pan, allowed to solidify, and ground finely. The product was then refluxed twice in acetone (1.5 hours, 700 ml each time), once in 2 percent aqueous hydrochloric acid (1.5 hours, 700 ml of acid), once in water (1.5 hours, 700 ml of water) and again once in acetone (1.5 hours, 700 ml). The final product was dried in a vacuum oven at 100° C. for 24 hours.

Poly(aryl ether ketone) (VIII)
Poly(aryl ether ketone) (VIII) was of the following structure:

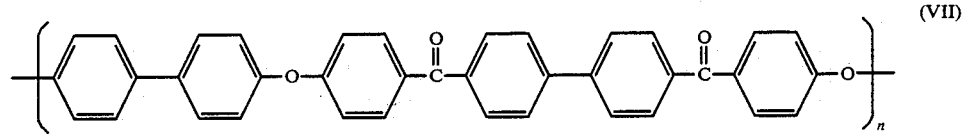

and had an RV of 0.28 dl/g as measured at 25° C. in 96 percent sulfuric acid solution (1 weight percent polymer solution). Its melting point is shown in Table I. It was made by the following method:

A 250 ml flask was fitted with a mechanical stirrer, nitrogen inlet, thermocouple-controller, Dean Stark trap with a condenser and an addition funnel. The flask was charged with:

21.91 g (0.055 mole) 1,4-bis-(4-fluorobenzoyl)benzene,
5.51 g (0.050) hydroquinone,
5.14 g (0.048 mole) sodium carbonate,
0.35 g (0,003 mole) potassium carbonate, and
75.0 g diphenyl sulfone.

After complete displacement of air with nitrogen, 20 ml of xylene were added as the reactor was heated to 200° C. for one hour, 250° C. for 15 minutes and 320° C. for 30 minutes. This was followed by the addition of 1.61 g (0.005 mole) 1,4-bis(4-fluorobenzoyl)benzene.

After 15 additional minutes at 320° C., the reaction mixture was poured into a stainless steel pan, allowed to solidify, and ground finely. The product was then refluxed twice in acetone (1.5 hours, 700 ml of acetone each time), once in 2 percent aqueous hydrochloric acid (1.5 hours, 700 ml of Aq.HCl), once in water (1.5 hours, 700 ml of water) and again once in acetone (1.5 hours, 700 ml of acetone). The product was dried in a vacuum oven at 100° C. for 24 hours.

TABLE I

| Melting Points of Poly(aryl ether ketones) | |
|---|---|
| Poly(aryl ether ketone) | $T_m$(°C.) |
| (I) | 341 |
| (II) | 337 |
| (III) | 337 |
| (IV) | 294,318,351 |
| (V) | 390 |
| (VI) | 430 |
| (VII) | 474 |
| (VIII) | 432 |

Control A

Poly(aryl ether ketone) (II) was fluxed in a Brabender Plasticorder mixer at 360° C. for five minutes. The sample was pressed into a thin (ca. 5 mil) film at 400° C. and quenched into ice water. Samples of the film were placed in a Perkin-Elmer DSC-2 calorimeter and heated to 400° C. at 10° C./minute. The melting point, Tm, and heat of fusion, Hf, were determined as in Control A. The samples were then cooled at 10° C./minute, 40° C./minute and 80° C./minute and the crystallization temperature, Tc, was determined as the maximum in the crystallization exotherm. Samples were also heated to 400° C. then cooled at 160° C./minute to a crystallization temperature, Tx. Samples were crystallized isothermally at Tx and the time to reach the maximum in the crystallization rate was recorded as tc. The results are given in Table II.

Control B

A blend of 50 percent of poly(aryl ether ketone) (III) and 50 percent of a polyetherimide (Ultem 1000 obtained from General Electric Company) was made in a Brabender Plasticorder mixer at 350° C. The blend was fluxed for 5 minutes and then pressed into a thin (ca. 5 mil) film. The blend was found to be miscible as described in World Patent publication 8501-509A. Samples of this film were heated to 400° C. in a DSC-2 calorimeter and Tm and Hf determined. Samples were cooled from 400° C. at 10°, 40°, and 80° C./minute and Tc's were determined at each cooling rate. Samples were also heated to 400° C. and then cooled at 120° C./minute to Tx. The time at Tx for the maximum in the crystallization rate to occur was recorded at tc. The results are shown in Table III.

Control C

A blend of poly(aryl ether ketone) (II) with one weight percent of poly(aryl ether ketone) (V) was made at 360° C. in a Brabender Plasticorder mixer. The blend was pressed into thin film at 400° C. and tested as in Control A. The results are summarized in Table II.

Examples I–III

Blends of poly(aryl ether ketone) (II) with one weight percent of various nucleation aids were made at 360° C. in a Brabender Plasticorder mixer. The blends were pressed into thin films at 400° C. and tested as in Control A. The results are summarized in Table II.

TABLE II

| Example Nucleation Aid | Control A None | I PAEK*VI | II PAEK*VII | III PAEK*VIII | Control C PAEK*V |
|---|---|---|---|---|---|
| $T_m$(°C.) | 338 | — | — | — | — |
| ΔHf(cal/g) | 9.5 | — | — | — | — |
| $T_c$ at 10° C./min | 291 | 297 | 293 | 295 | 293 |
| $T_c$ at 40° C./min | 275 | 285 | 278 | 281 | 276 |
| $T_c$ at 80° C./min | 264 | 275 | 267 | 271 | 265 |
| $t_c$(sec) at 300° C. | 106 | 43 | 84 | 66 | 105 |
| $t_c$(sec) at 290° C. | 39 | 14 | 29 | 21 | 39 |
| $t_c$(sec) at 280° C. | 18 | 7 | 14 | 9 | 18 |

*PAEK = poly(aryl ether ketone)

In general, higher crystallization temperatures and short isothermal crystallization times indicate faster crystallization kinetics.

Comparing Control B to Control A and to Examples I to III, it is seen that PAEK V which has a melting point less than 400° C., is a much less effective nucleating agent than PAEK's VI, VII, and VIII with melting points greater than 400° C. In fact, the crystallization kinetics of this control are not much improved over Control A.

Further, the data of Table II show clearly that faster crystallization rates are observed upon addition of PAEK's (VI), (VII), and (VIII) to poly (aryl ether ketone) (II).

Example IV

A blend of 49.5 percent by weight of poly(aryl ether ketone) (III), 49.5 percent by weight of the polyetherimide of Control B and 1 percent by weight of poly(aryl ether ketone) (VI) was mixed in a Brabender Plasticorder mixer and pressed into a film as in Control B. It was tested as in Control B and the results are shown in Table III.

TABLE III

| Example Nucleation Aid | Control B None | IV PAEK (VI) | Control D None | V PAEK (IV) |
|---|---|---|---|---|
| $T_m$(°C.) | 337 | — | — | — |
| ΔHf(cal/g) | 4.5 | — | — | — |
| $T_c$ at 10° C./min | 246 | 262 | 279 | 280 |
| $T_c$ at 40° C./min | 229 | 232 | 253 | 255 |
| $T_c$(sec) at 290° C. | 589 | 353 | 233 | 233 |
| $t_c$(sec) at 280° C. | 221 | 158 | — | — |
| $t_c$(sec) at 270° C. | 123 | 100 | — | — |
| $t_c$(sec) at 260° C. | 108 | 72 | — | — |

TABLE III-continued

| Example Nucleation Aid | Control B None | IV PAEK (VI) | Control D None | V PAEK (IV) |
|---|---|---|---|---|
| t_c(sec) at 250° C. | 106 | 63 | — | — |
| t_c(sec) at 240° C. | 145 | 80 | — | — |
| t_c(sec) at 230° C. | 244 | 131 | — | — |

Clearly, the addition of the high melting PAEK (VI) to a miscible blend of the poly(aryl ether ketone) (III) and the polyetherimide leads to compositions having significantly improved crystallization rates.

Control D

A blend of 60 percent by weight of poly(aryl ether ketone) (III) and 40 percent by weight of the polyetherimide of Control B was prepared in a Brabender Plasticorder mixer and pressed into a thin film as in Control B. It was tested as in Control B and the results are given in Table III.

Example V

A blend of 59 percent by weight of poly(aryl ether ketone) (III), 40 percent by weight of the polyetherimide of Control B, and 1 percent by weight of poly(aryl ether ketone) (IV) was prepared and tested as in Control D above. The results are given in Table III. The results show that the addition of PAEK IV (which has a melting point less than 400° C.) to Control D produces little improvement in crystallization kinetics.

Control E

A blend of 60 percent by weight of Poly(aryl ether ketone) (I) and 40 percent by weight of the polyetherimide of Control B was extruded in a single screw one-inch diameter (L/D=30) extruder at about 380° C. The resultant blend was pelletized and injection molded in a Newbury 1.25 ounce reciprocating screw injection molding machine under the following conditions:

| Barrel temperature | 370° C. |
|---|---|
| Mold temperature | 245° C. |
| Injection pressure | 300 psi |
| Cycle time | 45 sec |

Under the above conditions, the molded test specimens were not fully crystallized when ejected from the mold. As a result, they warped and adhered to the mold surface.

EXAMPLE VI

A blend of 59.5 percent by weight of Poly(aryl ether ketone) (I), 40 percent by weight of the polyetherimide of Control E, and 0.5 percent by weight of Poly(aryl ether ketone) (VI) was compounded and molded as in Control E. In this instance the blend crystallized to a significantly greater extent during molding and as a result warpage was low and adherence to the mold surface was not a problem.

What is claimed is:

1. A poly(aryl ether ketone) composition having increased crystallization rates comprising:
    (a) at least 98 percent by weight of a poly(aryl ether ketone) having a melting point no more than about 390° C., and further comprising ether groups joined to keto groups through 1,4-phenylene groups, with the proviso that where two keto groups are attached to the same phenylene ring, up to 50 percent of the keto groups can be in position meta with respect to each other; and
    (b) 2 percent or less by weight of a second poly(aryl ether ketone) having a melting point higher than about 400° C., and further comprising (i) either groups joined to keto groups through 1,4-phenylene groups and (ii) at least one member selected from the group consisting of:

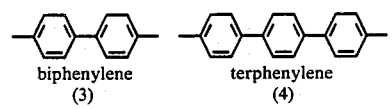
biphenylene (3)    terphenylene (4)

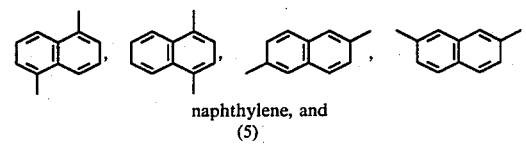
naphthylene, and (5)

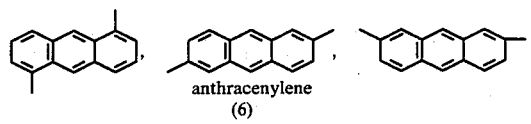
anthracenylene (6)

with the proviso that where two keto groups are attached to the same phenylene ring, up to 50 percent of the keto groups can be in position meta with respect to each other.

2. A composition according to claim 1 wherein the first poly(aryl ether ketones) include those having repeating units of the formulae:

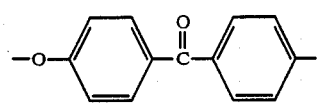

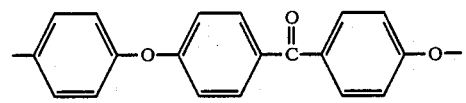

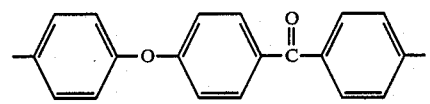

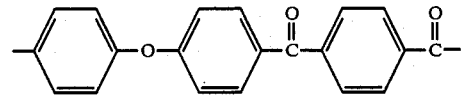

-continued

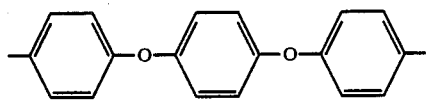

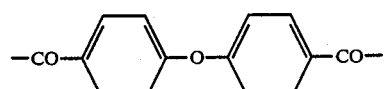

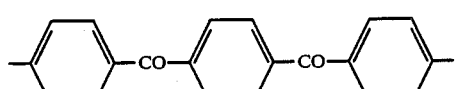

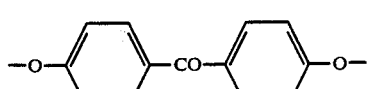

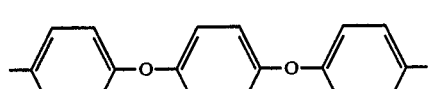

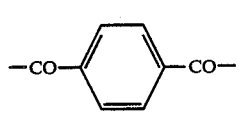

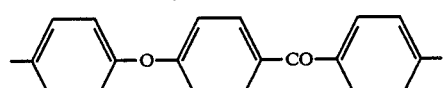

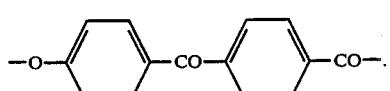

3. A composition according to claim 1 wherein the poly(aryl ether ketone) having a melting point no more than about 390° C., contains repeating units of one or more of the following formulae:

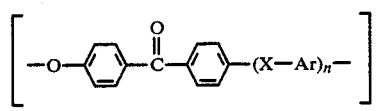

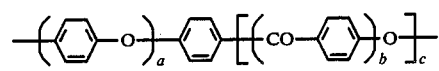

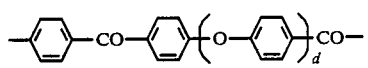

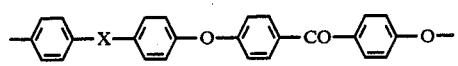

-continued

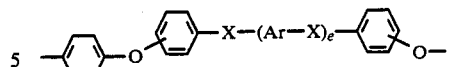

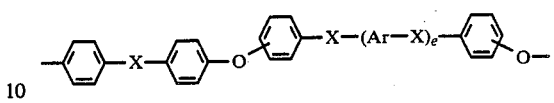

wherein Ar is independently a divalent aromatic radical selected from at least one member of the group consisting of phenylene, biphenylene, terphenylene, naphthylene and anthracenylene, with the proviso that not more than about 20 mole percent of Ar is selected from at least one member of the group consisting of biphenylene, terphenylene, naphthylene and anthracenylene; X is independently O or CO and n is an integer of from 0 to 3; b, c, d, and e are 0 to 1; and a is an integer of 1 to 4.

4. A composition according to claim 1 wherein the poly(aryl ether ketone) having a melting point higher than about 400° C., contains repeating units of one or more of the following formulae:

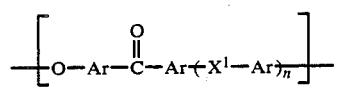

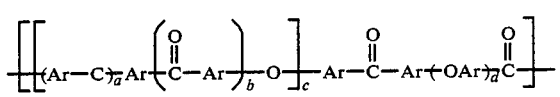

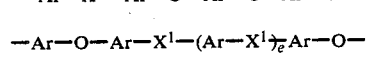

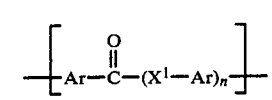

wherein Ar is independently a divalent aromatic radical selected from at least one member from the group consisting of phenylene, biphenylene, terphenylene, naphthylene and anthracenylene; $X^1$ is independently O,

or a direct bond, and n is an integer from 0 to 3; b, c, d, and e are 0 to 1; and a is an integer of from 1 to 4.

5. A composition according to claim 4 wherein the poly(aryl ether ketone) is of the following formula:

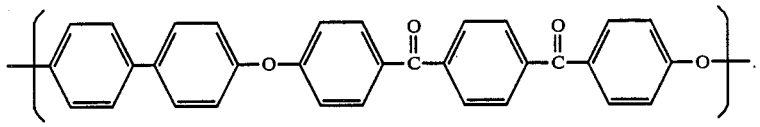

6. A composition according to claim 4 wherein the poly(aryl ether ketone) is of the following formula:

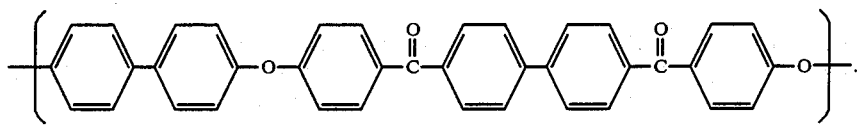

7. A composition according to claim 4 wherein the poly(aryl ether ketone) is of the following formula:

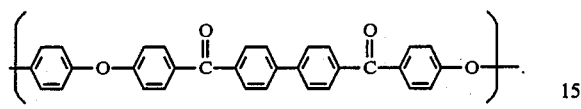

8. A poly(aryl ether ketone) composition having increased crystallization rates comprising:
(a) at least 98 percent by weight of a poly(aryl ether ketone) having a melting point no more than about 390° C., and further comprising ether groups joined to keto groups through 1,4-phenylene groups, with the proviso that where two keto groups are attached to the same phenylene ring, up to 50 percent of the keto groups can be in position meta with respect to each other; and
(b) 2 percent or less by weight of a second poly(aryl ether ketone) having a melting point higher than about 400° C., and further comprising (i) ether groups joined to keto groups through 1,4-phenylene groups and (ii) a biphenylene, with the proviso that where two keto groups are attached to the same phenylene ring, up to 50 percent of the keto groups can be in position meta with respect to each other.

* * * * *